United States Patent
Brayer (10) Patent No.: US 9,474,247 B2
(45) Date of Patent: Oct. 25, 2016

(54) MILKING SYSTEM

(71) Applicant: SCR ENGINEERS LTD, Netanya (IL)

(72) Inventor: Eyal Brayer, Kfar Monash (IL)

(73) Assignee: SCR ENGINEERS LTD, Netanya (IL)

( * ) Notice: Subject to any disclaimer, the term of this patent is extended or adjusted under 35 U.S.C. 154(b) by 0 days.

(21) Appl. No.: 14/415,256

(22) PCT Filed: Jul. 25, 2013

(86) PCT No.: PCT/IL2013/050637
§ 371 (c)(1),
(2) Date: Jan. 16, 2015

(87) PCT Pub. No.: WO2014/016840
PCT Pub. Date: Jan. 30, 2014

(65) Prior Publication Data
US 2015/0196003 A1     Jul. 16, 2015

Related U.S. Application Data (60) Provisional application No. 61/675,342, filed on Jul. 25, 2012.

(51) Int. Cl.
| | | |
|---|---|---|
| A01J 5/017 | (2006.01) | |
| A01J 5/007 | (2006.01) | |
| A01J 5/013 | (2006.01) | |
| A01J 5/04 | (2006.01) | |
| A01J 5/16 | (2006.01) | |

(52) U.S. Cl.
CPC ............... *A01J 5/0175* (2013.01); *A01J 5/007* (2013.01); *A01J 5/013* (2013.01); *A01J 5/017* (2013.01); *A01J 5/041* (2013.01); *A01J 5/16* (2013.01)

(58) Field of Classification Search
USPC ........................................................ 119/14.08
See application file for complete search history.

(56) References Cited

U.S. PATENT DOCUMENTS

| | | | |
|---|---|---|---|
| 2,425,873 A | 8/1947 | Gessler | |
| 4,273,070 A | 6/1981 | Hoefelmayr | |
| 4,344,385 A | 8/1982 | Swanson et al. | |
| 4,537,152 A | 8/1985 | Thompson | |
| 4,574,736 A * | 3/1986 | Tanaka | A01J 5/0133 |
| | | | 119/14.08 |
| 5,080,040 A | 1/1992 | van der Lely et al. | |
| 6,425,345 B1 | 7/2002 | Lind et al. | |
| 6,948,449 B2 | 9/2005 | Van Der Lingen et al. | |
| 8,171,883 B2 | 5/2012 | Petterson | |
| 8,646,411 B2 * | 2/2014 | Wartenhorst | A01J 5/007 |
| | | | 119/14.02 |
| 8,978,584 B2 * | 3/2015 | Uslar Valenzuela | A01J 5/007 |
| | | | 119/14.08 |
| 2003/0154924 A1 | 8/2003 | Birk et al. | |
| 2007/0215053 A1 | 9/2007 | Duke | |

OTHER PUBLICATIONS

Israeli Patent Office, "International Search Report and Written Opinion in corresponding International Application No. PCT/IL13/50637", Nov. 27, 2013, Israel.

* cited by examiner

*Primary Examiner* — Korie H Chan (57) ABSTRACT

A compact milking system for conventional milking parlors. The system supports individual milking of each of the milk glands. The system possesses a compact form and weight providing conventional milking parlors with capabilities currently supported only by costly robotic milking systems. The system comprises at least two teat cups attachable to an animal's udder; at least one Multi-Conduit Tube (MCT) having at least two milk conduits; at least one Separate Streams Claw wherein each milk stream communicates with only one teat cup and one MCT milk conduit; and one Sensing and Diverting Unit communicating with the MCT and operative to separately receive and analyze milk from each MCT milk conduit.

13 Claims, 8 Drawing Sheets

FIG. 5B
(SECTION W-W)

FIG. 5D
(SECTION Q-Q)

FIG. 5C
(SECTION Q-Q)

MILKING SYSTEM

TECHNICAL FIELD

The current system relates to apparatuses and processes for extracting milk from animals with milk glands and more specifically to quarter milking animals with milk glands.

BACKGROUND

Milk generally consists of water, fat, protein, and lactose. Dairy cows, provide the vast majority of milk for human consumption. However, milk from goats, sheep, water buffalo and reindeer is consumed in many countries.

Milking parlors are used worldwide for milking animals, typically animals with two milk glands (e.g., goats and sheep) or four milk glands (e.g. cows and buffaloes). The parlors may generally be divided into two types: conventional or "semi-automatic" milking parlors and robotic milking parlors. These two types of milking parlors could differ significantly in regards to architecture, operating procedures, labor intensity, automation, capital investment, degree of analysis of the milk and the ability to separate the milk according to the analyzed properties.

In conventional or "semi-automatic" milking parlors, a milking cluster includes two or four teat cups connected to a milk claw via two or four short tubes and is manually attached to each individual animal. From an ergonomic standpoint the claw weight and dimensions are adapted for manual handling. U.S. Pat. No. 4,537,152 discloses a configuration in which a milking cluster is configured so that each teat cup in the cluster is attached to a corresponding teat of the animal. The milk obtained from the teats attached to a specific cluster flows to a single common milk collecting chamber which is an integral part of the milk claw. The milk accumulated in and which eventually exits from the chamber is referred to as "composite milk" because milk from all teats of the animal is mixed together in the chamber. Typically, the composite milk flows out of the milk claw through a single tube to a sensor unit. The sensor unit is able to identify various parameters of milk, such as milk quantity, fat content, protein content, presence of red blood cells, phagocytes, hemoglobin and many others. Commonly, the conventional or "semi-automatic" milking parlor includes one milk sensor unit per stall fed from a single milk line leading from the milking claw common milk collecting chamber. If the sensor does not detect any abnormalities in the milk the composite milk flows to a main milk line which carries milk from a plurality of sensor units (i.e., stalls) to a desired milk collection facility.

However, in many situations milk from various glands of the same animal, differ in quality (fat and protein content) and/or sometimes one or more glands are infected. In such situations it is advantageous to sense each gland separately and if necessary divert the milk obtained from a problematic teat to one or more different milk lines.

Robotic milking parlors, may or may not include a milk claw, however the milk claw usually serves in these parlors as part of the robotic teat cup attaching system as described in U.S. Pat. No. 8,171,883. Commonly, and as described in U.S. Pat. Nos. 6,425,345 and 6,948,449 teat cups are attached to animals by a robot and each gland is milked separately. In the robotic system, in cases where milk from different glands differs in the quantity of measured components—for example, protein and/or fat, the obtained milk could be diverted as desired so that two or more milk parameters may be either combined or kept separate.

The costs of robotic milking parlors are higher than conventional parlors, require more space and different architecture, and usually are different in design from conventional parlors. Installation of robotic systems in existing conventional parlors is not straightforward and requires major changes in infrastructure, parlor design and milking routines as well as investment of capital.

To date, conventional milking, which is the most common way of milking in the world, does not include quarter milking. A milking system for quarter milking in conventional milking parlors requires an operator to handle each teat cup separately which is more time intensive and labor intensive. The cost of current sensor/diverting systems is high and the amount of tubes required to transport the quarter milk from each animal make this option not cost effective. Consequently, quarter milking in conventional milking parlors is very expensive, unfriendly to operator and complicated. The solutions currently available on the market that attempt to provide the benefits of quarter milking in conventional milking parlors, while avoiding the costly investment in robots and without changing parlor design and architecture are insufficient.

SUMMARY

A compact milking system for conventional milking parlors supporting individual milking of each of the milk glands. The milk obtained from each gland could be weighed separately, analyzed separately, and kept separate from milk obtained from other glands. The current milking system could also manage the flow in each of the channels by diverting a channel providing poor quality milk and combining channels of supplying milk of adequate quality. This prevents contaminated milk obtained from one of an animal's teats from contaminating milk obtained from the animal's other teats. The Sensing and Diverting Unit of the present system is 5 to 10 times lighter and 5 to 10 times smaller than the sensing and diverting element of the robotic milking system. The system incorporates one or more compact milk quality sensors and provides individual vacuum control of each separate milking channel supporting full utilization of a single teat milking potential. Milk obtained from one teat does not come in contact with milk obtained from another teat thus cross-contamination between glands is avoided.

The system supports quarter milking in a compact form and weight providing conventional milking parlors with capabilities currently supported only by costly robotic milking systems.

BRIEF DESCRIPTION OF THE DRAWINGS

The present invention will be understood and appreciated more fully from the following detailed description, taken in conjunction with the drawings in which.

DETAILED DESCRIPTION

In the present application the various examples, drawings, apparatuses, systems and processes referring to the extraction of milk from mammals having four teats are brought forth for illustrative purposes only and should be understood as applicable to any mammal having two or more teats.

Figure 1:
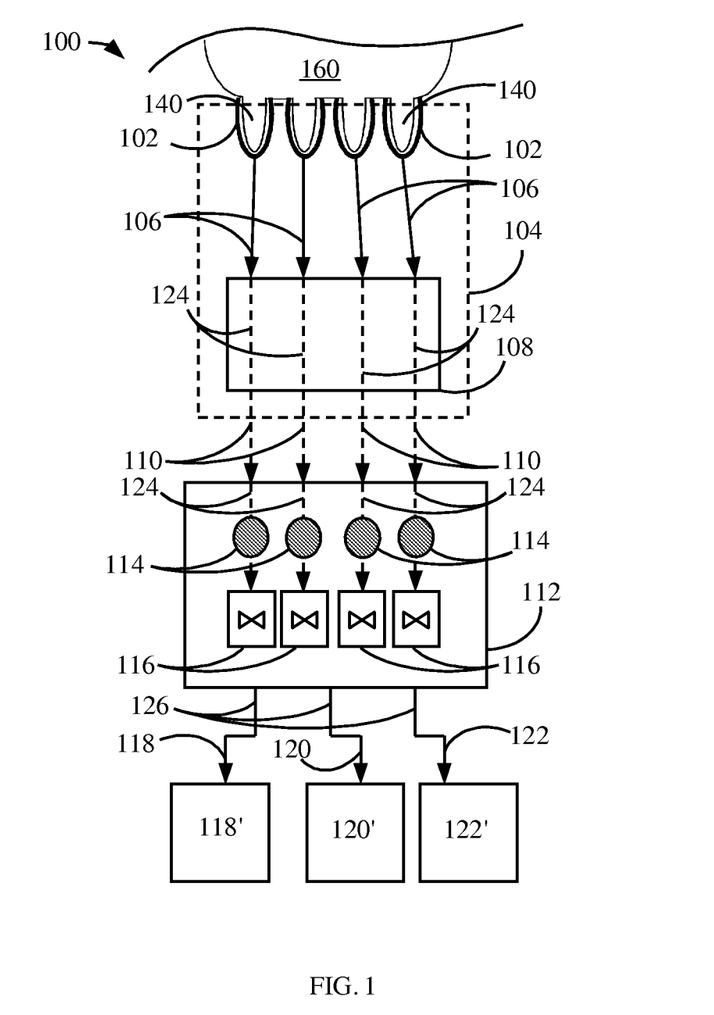
FIG. 1 is a simplified block diagram of a quarter milking system 100 designed for a conventional milking parlor in accordance with an example.

Referring now to FIG. 1, which is a simplified block diagram of a quarter milking system 100 designed for a conventional milking parlor in accordance with an example. Four teat cups 102 of a milking cluster 104 are attached to four corresponding teats 140 of an udder 160 of a milking animal. The milk obtained from each individual teat flows via a corresponding short tube 106 into a chamberless (i.e., does not include a milk chamber) Separate Streams Claw (SSC) 108 where two or more milk streams 124 are maintained separate from each other and do not come in contact with one another.

Figure 8:
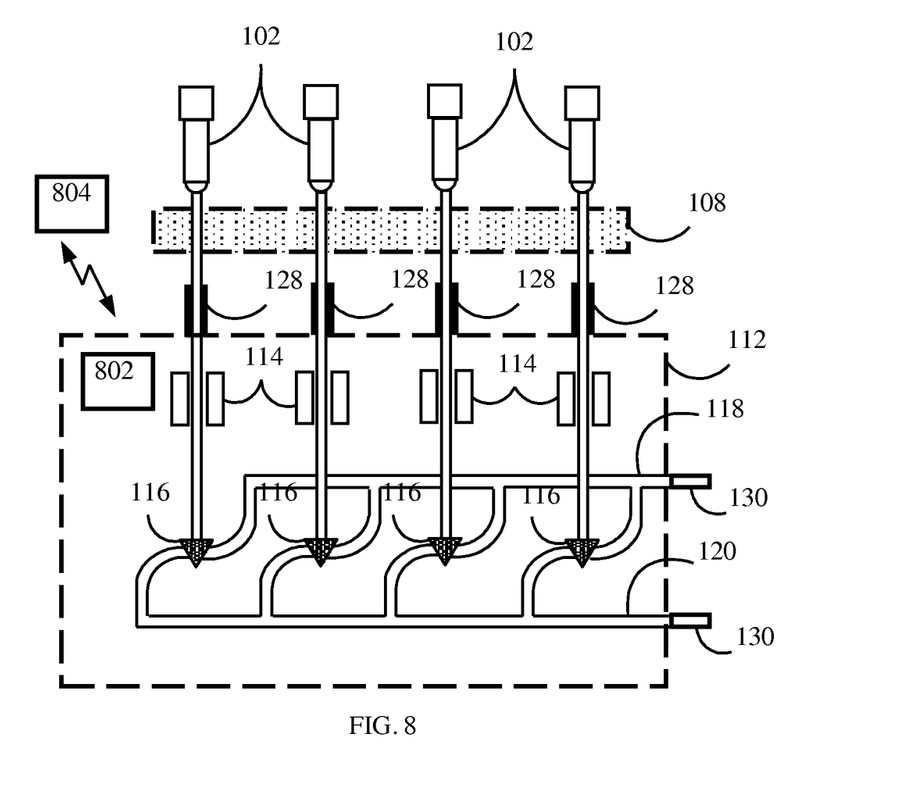
FIG. 8 is a simplified milk flow diagram through a Sensing and Diverting Unit (SDU) in accordance with an example.

The milk streams exit SSC 108 separately via corresponding long tubes 110 and flow into a Sensing and Diverting Unit (SDU) 112 via distinct nipples 128 (FIG. 8). Each of the milk streams is individually analyzed by a dedicated plurality of sensors 114 in SDU 112 and selectively diverted by a changeover valve 116 via a determined collecting line such as a grade A milk line 118, grade B milk line 120 and scrap milk line 122 into a corresponding collection vat 118', 120' and 122'. In the example of quarter milking system 100 illustrated in FIG. 1, the milk streams obtained from teats 140 are maintained separate throughout the course of their flow from teats 140 to changeover valves 116.

Figure 2:
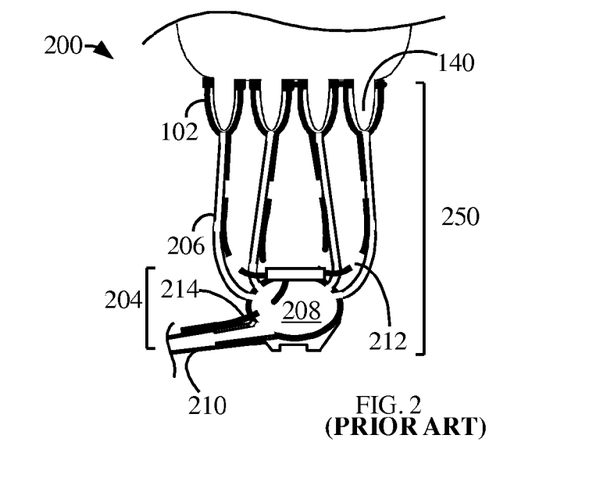
FIG. 2 is a simplified cross-section view illustrations of a conventional or semi-automatic milking system (prior art)
Figure 3A:
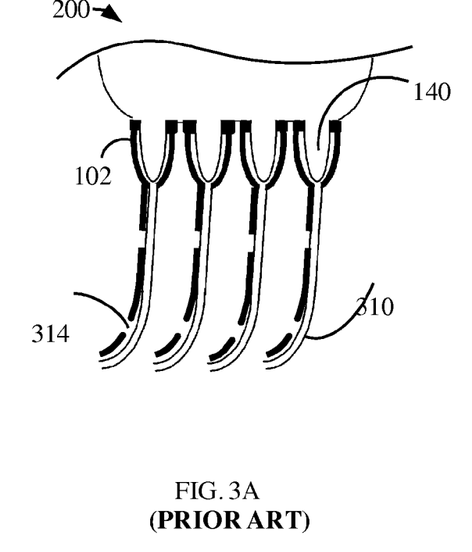
FIGS. 3A and 3B are simplified cross-section view illustrations of robotic milking systems (prior art)
Figure 3B:
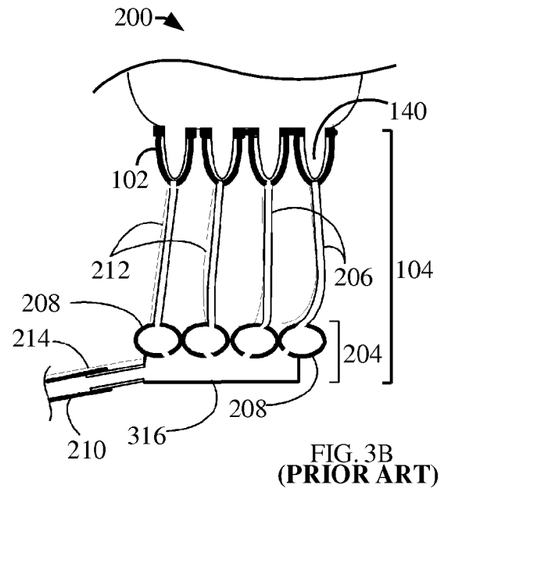

Reference is now made to FIGS. 2, 3A and 3B, which are simplified cross-section view illustrations of a conventional or semi-automatic (FIG. 2) and a robotic (FIGS. 3A and 3B) milking systems. As shown in FIG. 2, a conventional or semi-automatic milking system 200 milking cluster 104. Milking cluster 250 includes a milk claw 204, two or four teat cups 102 connected to two or four short tubes 206 and pulsating vacuum tubes 212. Short tubes 206 could be connected to a milk collecting chamber 208. Milk cluster 104 teat cups 102 are manually attached to each corresponding teat 140. Milk obtained from teats 140 flows via short tubes 206 to single common milk collecting chamber 208 which is commonly an integral part of milk claw 204. The composite milk accumulated in chamber 208 exits via a single long composite milk tube 210.

Cluster 104 pulsating vacuum tubes 212, fed from one or more common pulsating vacuum tubes 214 (depicted in FIGS. 2, 3A, 3B and 4 as broken lines) apply pulsating pressure to each corresponding teat cup 102 to initiate the milking process. The pulsating pressure to the teats is controlled (i.e., on/off command) to all teats collectively and does not to provide individual teat milking control.

FIGS. 3A and 3B illustrate robotic milking systems. The robotic system is a quarter milking system in which each teat cup 102 is attached to a corresponding teat 140 and connected to a quarter milk long tube 310. Commonly, and as shown in FIG. 3A, robotic systems do not include milking claws such as milking claw 204 and each quarter milking long tube 310 carries the milk within directly to a collection vat or a diverting unit. Each teat cup 102 is individually supplied by a corresponding pulsating vacuum tube 314. The pulsating pressure to teat 140 is individually controlled.

Another robotic system such as the system depicted in FIG. 3B, could be a semi-quarter milking system having a milk claw including, for example, four separate milk collecting chambers 208. This is could be considered a semi-quarter milking system as compared to a quarter milking system in that the milk in the milking claw flows into a common collecting basin 316 and exits the milking claw via a single outlet and into a single long composite milk tube 210, whereas in quarter milking the milk steams remain separate from the teat cup to the milk collection vat.

Figure 4:
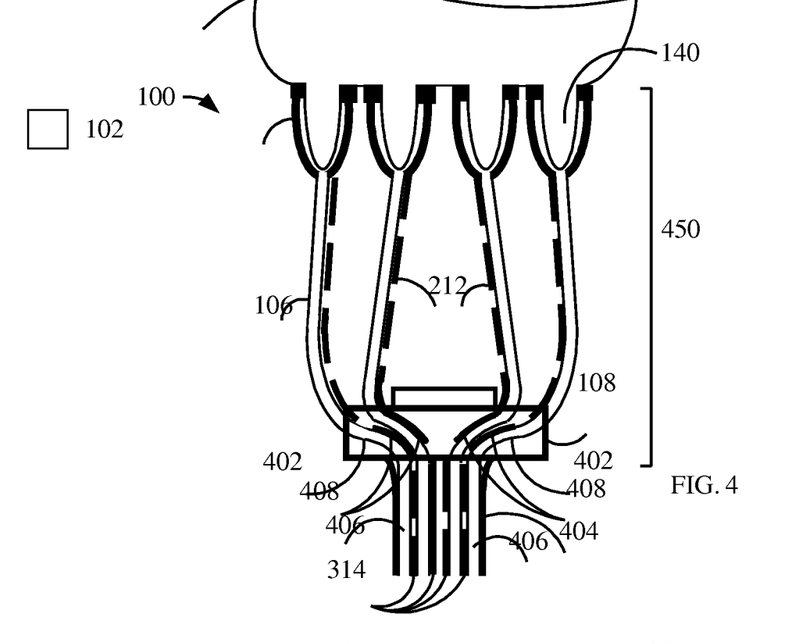
FIG. 4 is a cross-section view simplified illustration of a milking cluster in accordance with an example.

Referring now to FIG. 4, which is a cross-section view simplified illustration of a milking cluster in accordance with an example. A quarter milking system 100 cluster 450 includes two or more teat cups 102 each attached to a corresponding teat 140, and sealingly connected to a corresponding short tube 106. Tubes 106 could be sealingly connected to a Separate Streams Claw (SSC) 108. SSC 108 could include two or more distinct milk conduits 402 in which milk received from each individual teat 140 via short tubes 106 is maintained separate from milk obtained from the other teats or quarters. Conduits 402 are sealingly connected to a Multi- Conduit Tube (MCT) 404 including corresponding two or more milk conduits 406.

The milk obtained from each gland could be weighed separately, analyzed separately, and kept separate from milk obtained from other glands. In milking of animals with four milk glands, a milking system in which each gland is milked independently could be referred to as "a quarter milking system". One advantage of a quarter milking system is in that contaminated milk obtained from one of an animal's teats could be prevented from contaminating milk obtained from the animal's other teats. Another advantage is that milk obtained from one teat does not come in contact with milk obtained from another teat thus cross-contamination between glands is avoided.

To date, conventional milking, which is the most common way of milking in the world, does not include quarter milking. A milking system for quarter milking in conventional milking parlors requires an operator to handle each teat cup separately which is more time intensive and labor intensive. The cost of current sensor/diverting systems is high and the amount of tubes required to transport the quarter milk from each animal make this option not cost effective. Consequently, quarter milking in conventional milking parlors is very expensive, unfriendly to operator and complicated. The solutions currently available on the market that attempt to provide the benefits of quarter milking in conventional milking parlors, while avoiding the costly investment in robots and without changing parlor design and architecture are insufficient.

In a quarter milking system, such as system 100, could provide a low-cost quarter milking chamberless system to a conventional milking parlor in that the number of milk stream entering SSC 108 is identical to the number of milk streams streaming out of SSC 108. The separate streams streaming out of SSC 108 could be drained by MCT 404 thus remaining separate until reaching SDU 112.

SSC 108 could also include vacuum supply conduits or channels 408 (represented by a broken line) which could be connected at one end thereof to a corresponding cluster 104 pulsating vacuum tube 212 supplying each individual teat cup 102 and at the other end to a corresponding pulsating vacuum tube 314. One or more vacuum tubes 314 could be an integral part of MCT 404 as will be described in greater detail below. The pulsating pressure to each teat 140 could be individually controlled. Unlike in the conventional milk cluster, the vacuum applied to each teat, i.e. quarter, could be controlled individually by a dedicated vacuum supply line including a vacuum tube 314, SSC 108 vacuum supply conduit 408 and cluster 104 pulsating vacuum tube 212 so that a single quarter could be turned on or off independently of the other quarters.

Figure 5A:
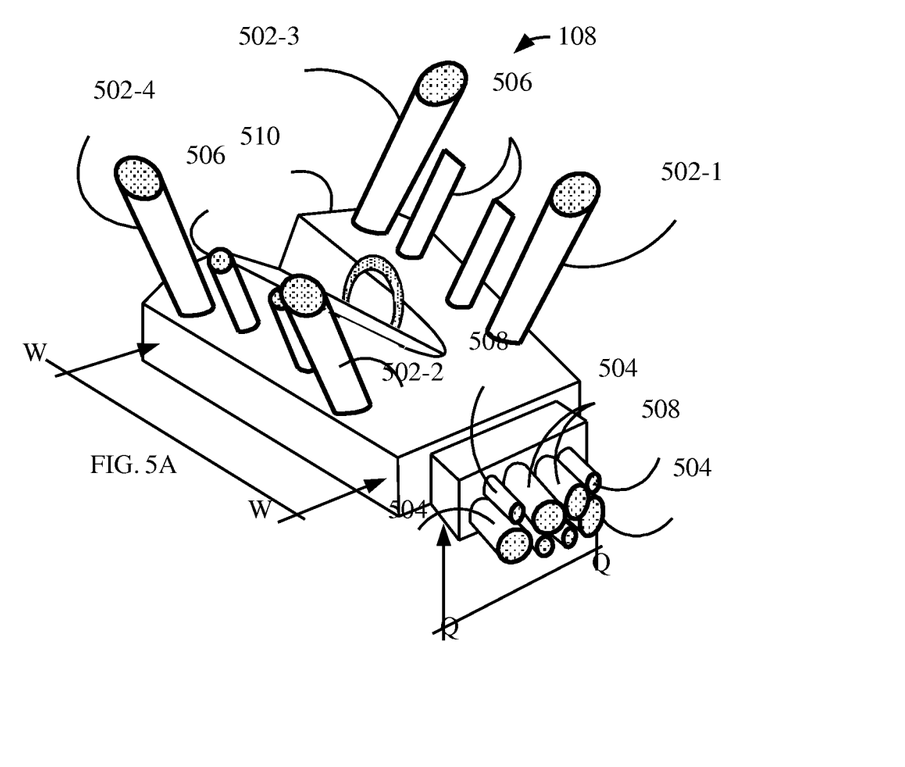
FIGS. 5A, 5B, 5C, and 5D are oblique and cross-section views of a Separate Stream Claw (SSC) in accordance with an example.
Figure 5B:
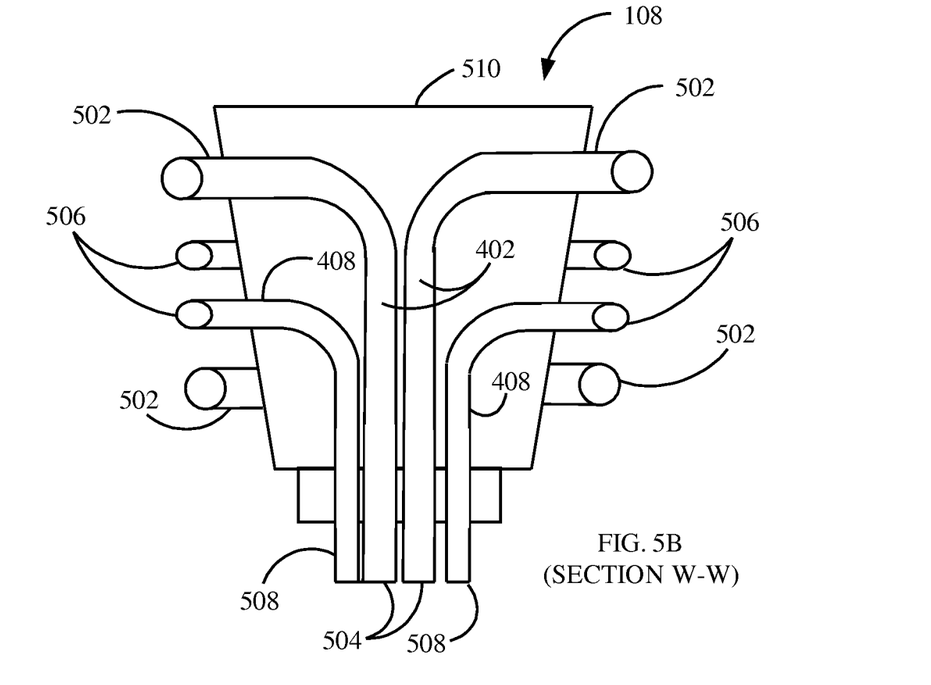
Figure 5C:
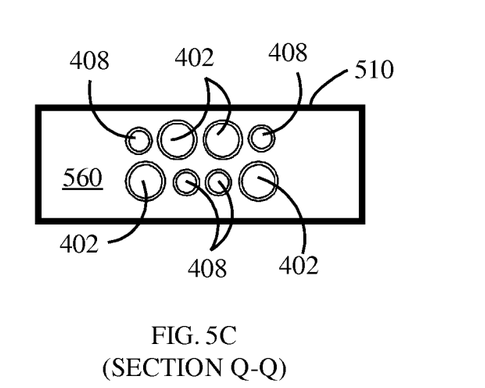
Figure 5D:
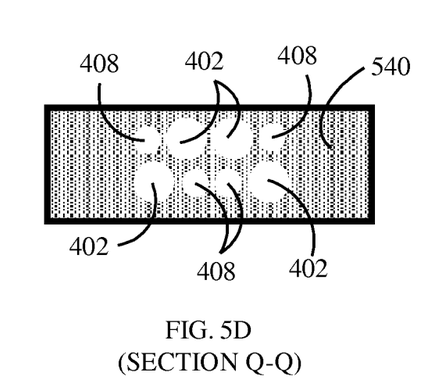

Reference is now made to FIGS. 5A, 5B, 5C, and 5D, which are oblique and cross-section views of a Separate Stream Claw (SSC) 108 in accordance with an example. FIG. 5B is a cross-section view of SSC 108 of FIG. 5A taken along axis W-W. FIGS. 5C and 5D are cross-section views of SSC 108 of FIG. 5A taken along axis Q-Q. SSC 108 could have 2, 4, or any other number of individual milk stream inlet nipples or tubes 502 (In FIG. 5A, nipples 502-1, 502-2, 502-3 and 502-4), individual milk stream conduits 402, and individual milk stream outlet nipples or tubes 504. Each inlet nipple or tube 502 could be sealingly connected to a single channel or conduit 402 and each channel or conduit 402 could be sealingly connected to a single outlet nipple or tube 504 to provide each milk stream a dedicated sealed pathway and prevent contact between milk streams inside SSC 108.

SSC 108 could be handled similarly to conventional claw 204 from an operator's standpoint.

Once milking cluster 104 is attached to an animal, SSC 108 could provide a plurality of individual distinct milk streams, one from each teat or quarter of the animal udder. Each inlet nipple or tube 502 could be sealingly connected to a different teat cup so that milk from a teat or quarter of an animal could flow through each short tube 106 into inlet nipple or tube 502. Additionally, SSC 108 negates the use of a milk collecting chamber 208 (i.e., it is chamberless) making cluster 104 much lighter in weight and shorter in length (measured from the teat cup to the bottom of the milking claw).

The configuration of SSC 108 conduits 402 (FIG. 5B) could be in a form of a tube protected by a molded capsule 510 (FIG. 5C) or a lumen, which is part of a multi-luminal potted enclosure 540 (FIG. 5D) enclosing several conduits 402 as will be explained in greater detail below. Conduits 402 could be comprised of or lined with metal, plastic, rubber, glass, composite or a combination thereof. Nipples 502/504 are configured for ease of sealed connection with teat cups 102 (FIG. 1) short tubes 106 and with long tubes or MCT 404 downstream SSC 108.

SSC 108 could also include two or more pulsating vacuum conduits 408. Each of pulsating vacuum conduits 408 could also be sealingly connected at a vacuum outlet nipple 506 at one end hereof to a corresponding teat cup 102 via a pulsating vacuum tube 212, so that each teat cup 102 is sealingly attached to one milk short tube 106 and one vacuum tube 212, and at an vacuum inlet nipple 508 located at the other end of pulsating vacuum conduits 408 to a dedicated vacuum source (not shown) via vacuum tube 314 (FIG. 3A).

Pulsating vacuum conduits 408 and pulsating vacuum tubes 212, as well as nipples 506/508 could have a diameter different in size than the diameter of milk stream inlet nipples or tubes 502, milk stream conduits 402, milk stream outlet nipples or tubes 504 and/or milk short tubes 106. Commonly, the diameter of vacuum conduits is smaller than that of milk channels, conduits or tubes.

Referring now to FIGS. 5C and 5D, which are cross-section views of SSC 108 of FIG. 5A taken along axis Q-Q at an imaginary level of convergence of conduits 402/408 with corresponding milk stream outlet nipples or tubes 504 and vacuum inlet nipples 508. FIG. 5C depicts a capsule 510 housing conduits 402/408. A void 560 could be defined between capsule 510 and conduits 402/408 and may be filled with a suitable material, air or vacuum as will be explained in greater detail below. Alternatively, capsule 510 could tightly envelope conduits 402/408 in a spaceless manner, i.e., without void 560. As shown in FIG. 5D, conduits 402/408 could be formed by a multi-luminal potted enclosure 540. Conduits 402/408 could be made of a same as or a different material than enclosure 540. In an example, conduits 402/408 and enclosure 540 could be produced in the same mold as a unitary structure. Alternatively and optionally, conduits 402/408 formed by multi-luminal potted enclosure 540 could be coated with a material different than that of enclosure 540.

Figure 6:
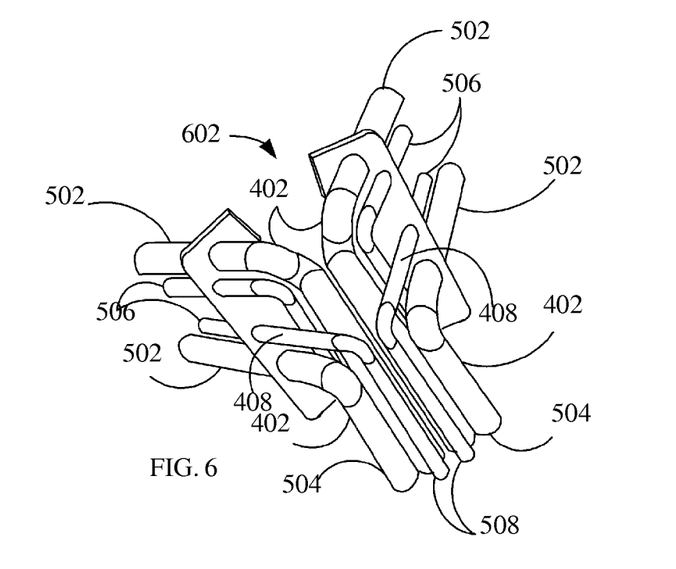
FIG. 6 is an oblique-view simplified illustration of an arrangement of conduits inside SSC in accordance with an example.

As shown in FIG. 6, which is an oblique-view simplified illustration of an arrangement of conduits 402/408 inside SSC 108 in accordance with an example, conduits 402 and 408 could be arranged and stacked inside SSC 108 in a manifold configuration 602 prior to encapsulation or formed in a manifold configuration by a potting process. This configuration could improve rigidity and durability as well as good control of conduits 402 and 408 geometry and position.

Molded capsule 510 and/or enclosure 540 could comprise a polymer such as a thermosetting or thermoplastic polymer. In one example, the thermosetting polymer could be polyurethane, epoxy, unsaturated polyester, vinyl ester polymer, amino resin, phenol resin or silicone-containing polymer. The polymer could be filled with filler or fibers. In another example, molded capsule 510 and/or enclosure 540 could be made of thermoplastic polymer such as acetal, polyurethane, polyamide, polyolefine, polyester, polycarbonate, poly vinyl chloride, acrylic, styrenic and thermoplastic elastomer. In yet another example the capsule could be manufactured by forming, machining and molding of polymer, metal, wood, ceramic or glass, forming or assembled or bonded on conduits 402/408.

Molded capsule 510 and/or enclosure 540 molding material may be solid or foamed. Inner voids or spaces such as void 560 could be left in the capsule to achieve a desired capsule weight.

Nipples 502/504/506/508 could be made of the same material as, or different materials than, conduits 402/408.

SSC 108 could have a weight of 100-1000 grams. This weight could include internal conduits 402/408 and capsule 510 or potting 540. The weight of cluster 140 according the current example, which includes SSC 108, short tubes 106 and teat cups 102 could vary between 0.5 to 5 kilograms.

The dimensions and weight of SSC 108 could be optimized to be ergonomically suitable for a comfortable grip by the human hand, providing comfort handling for both small size and large size hands. The weight is also optimized to provide a counterbalance to the pulsation stroke.

As described above, quarter milking system 100 could also include SDU 112, which is a mechanism for analyzing and separating milk streams 124 (FIG. 1) based upon characteristics of the milk in each of the streams. Typical characteristics could be fat and protein content, electrical conductivity, turbidity, density, flow rate, accumulated volume, presence of blood or blood cells in milk and other similar data.

SDU 112 could be compact and configured to be mounted in a conventional milking parlor space without need to change the parlor architecture and design. A plurality of independent milk streams 124 flow downstream from SSC 108 to SDU 112 via long tubes 110 or MCT 404.

Reference is now made to FIGS. 7A, 7B, 7C and 7D, which are cross section view simplified illustrations of Multi-Conduit Tube (MCT) 404 in accordance with several examples.

Figure 7A:
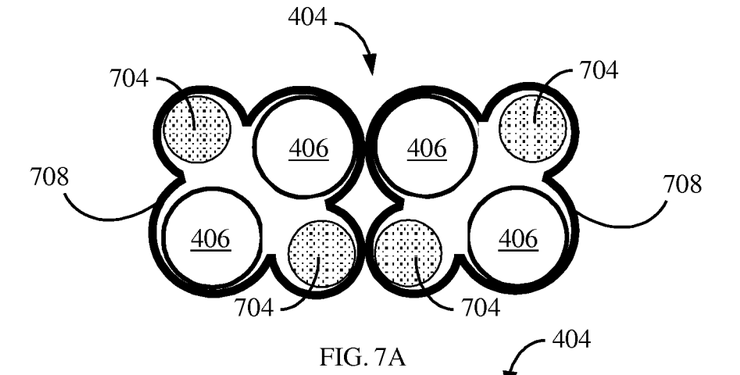
FIGS. 7A, 7B, 7C and 7D are cross-section view simplified illustrations of a Multi-Conduit Tube (MCT) in accordance with several examples.
Figure 7B:
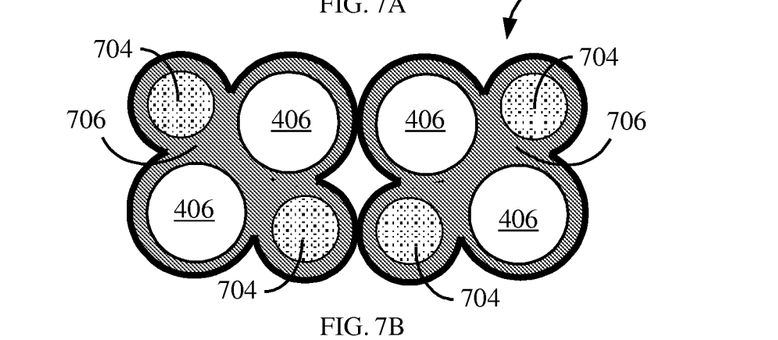
Figure 7C:
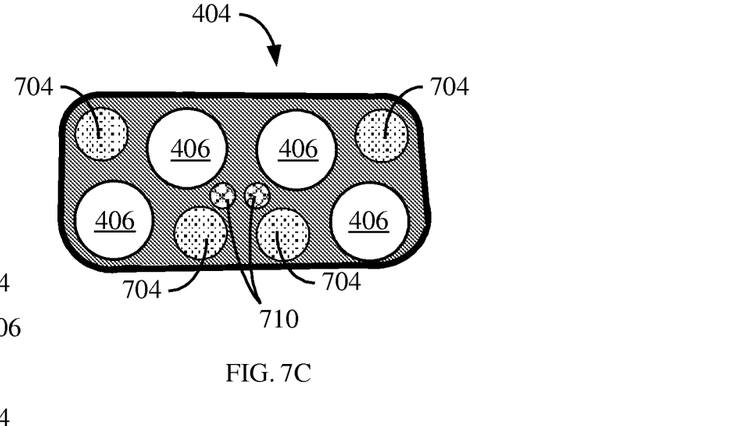
Figure 7D:
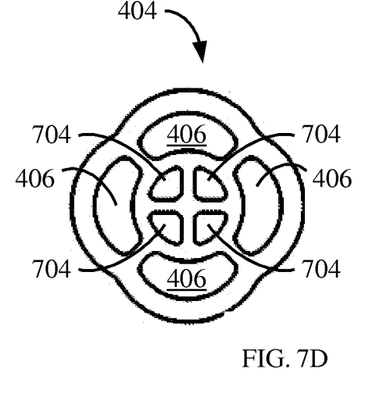

In example shown in FIGS. 7A-7D, MCT 404 relatively large diameter conduits 406 commonly convey milk whereas relatively smaller diameter conduits 704 commonly supply vacuum to pulsating tubes 212 via SSC 108. Multi-conduit tube 404 could be a molded flexible block 706 or an extruded flexible block 708 containing two or more milk conduits 406. MCT 404 may include two or more blocks 706/708 as shown in FIGS. 7A and 7B, or alternatively and optionally, form a single block as shown in FIGS. 7C and 7D. Blocks 706/708 could be made of a polymeric material, such as an elastomeric material for example, rubber, thermoplastic elastomer or plastomer. In an example, MCT 404 could be made of silicone rubber.

The average diameter of conduits 406 may be from about 6 to about 20 mm. When the cross-section of the conduits has a geometrical shape other than a circle, the "diameter" refers to the maximum measurement that could be taken across the cross-section of the conduit. MCT 404, as shown in FIGS. 7A-D, could also include conduits 710 in addition to milk conduits 406 and vacuum conduits 704. Conduits 710 could carry, for example, system washing cleaning fluid.

MCT 404 could also be made of a stack of molded or extruded tubes which are welded, bonded, or mechanically interwoven or joined by means of a mechanical connector. Joined MCT 404 could provide flexibility for easy maintenance and installation while avoiding issues associated with using a plurality of separate individual conduits.

Reference is now made to FIG. 8, which is a simplified milk flow diagram through SDU 112 in accordance with an example. SDU 112 is capable of detecting various attributes of the milk and milk flow of each milk stream 124 separately and provide data to a computerized system that could, based on a pre-defined protocol, activate changeover valves to separate the milk into different output streams 126 based on pre-defined criteria as will be explained in greater detail below. For example, separation of milk from an infected and/or sick quarter from other healthy quarters, separation of fat rich milk from fat thin milk and separating protein rich milk from low protein milk. Additionally or alternatively, SDU 112 could detect flow rate and total milk volume from each quarter providing important data regarding animal health and productivity.

Alternatively and optionally, SDU 112 could only sense each quarter milk separately and provide alerts to the user without automatically diverting the milk. This configuration is lower in cost than SDU 112 with diverting valves, and provides the dairyman or user warning of potential infection in specific quarters. For some users, the separate milking of each quarter, followed by separate sensing and the provision of an alert when necessary could be sufficient.

Referring back to FIG. 1, SDU 112 sensors 114 could be of or include, but not be limited to, the type of sensor described in U.S. Pat. Nos. 5,116,119 and 5,581,086. Sensors 114 could be positioned in separate channels, each sensor 114 dedicated to a corresponding milk stream 124 so different streams 124 do not come in contact within SDU 112.

SDU 112 could also be configured to provide a hermetic seal against leaks and the penetration of dirt and/or other contaminants while being easy to service and disassemble. SDU 112 could include a single-piece, two-piece or multi-piece shell made of plastic, glass, ceramic, composite, metal or combinations thereof and sealed by a seal or gasket and be manufactured by injection molding or compression molding or thermoforming of a thermoplastic material such as a polyamide, polysulfone, polyester, an acetal polymer, a polycarbonate, a polypropylene, styrenic, polyvinyl chloride and the like. In one example, SDU 112 could have a height of 280 mm, a width of 200 mm, and a depth of 200 mm.

Typically, each stream of milk 124 flows through a distinct nipple 128 sealingly attached to MCT 404 and into SDU 112. Each milk sensor 114 collects data specific to a corresponding distinct milk stream 124 obtained from a specific teat or quarter. The data from each sensor 114 could be then processed and optionally stored by a microprocessor or computer 802 in SDU 112. Alternatively, the data from each sensor 114 could be transferred to a central computer (not shown) where data is processed and further registered, analyzed, and stored. The data is useful for diverting the different milk streams 124 according to a pre-defined protocol, as well as to provide indication of the specific animal health and status.

The analysis of the milk could be used to determine to where the milk from each gland is to be diverted. In particular, SDU 112 could include changeover valves 116, which are configured to allow each milk stream 124 to independently flow to one of a plurality of pathways while restricting each stream from flowing to a pathway other than the determined pathway. Changeover valves 116 could be controlled and manipulated pneumatically, automatically or manually, usually with compressed air or a vacuum, electrically or magnetically or by any known method in the art. In the current example depicted in FIG. 8, changeover valves 116 could be two-way, three-way or four-way valves. The pathways commonly include a high quality grade A milk line 118, for example high protein or high fat content milk, a lower quality grade B milk line 120 and a scrap milk line (not shown), for example milk contaminated by bacteria, blood or inflammatory by-products. Milk lines 118, 120 and 122 could be sealingly connected to SDA 112 via a plurality of outlet nipples 130.

Additionally to diverting the milk, the information of each milk stream of a specific animal and/or animal udder quarter obtained by sensors 114 could be recorded on a computerized data system and be statistically analyzed. Analyzed parameters could include for example, fat content, protein content, blood present in milk, flow, volume, turbidity, density etc. The analyzed data is a useful indicator for animal health, fertility, estrus, feeding deficits and potential disease.

Processing and analysis may be performed inside SDU 112 by a microprocessor or computer 802 (FIG. 8) or by a remote computer 804. Remote computer 804 may be wired to SDU 112 or be connected through a wireless interface. Computer or microprocessor 802 could produce commands to changeover valves 116 to divert milk streams 124 as will be explained in greater detail below.

Figure 9A:
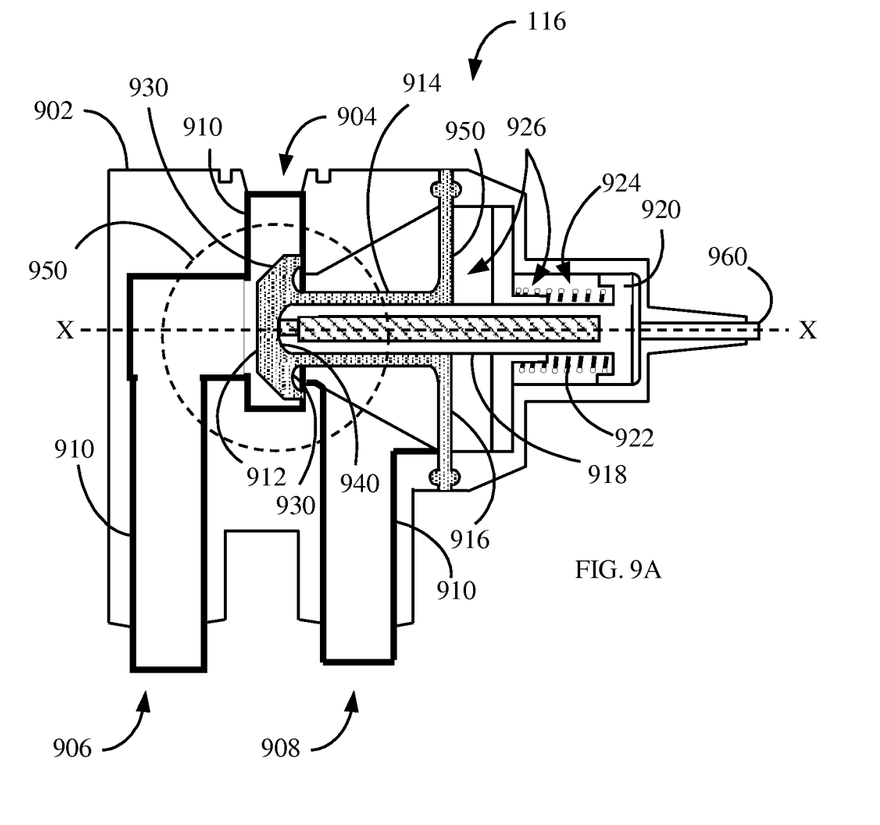
FIGS. 9A, 9B and 9C are cross-section view simplified illustrations of a changeover valve in accordance with an example.
Figure 9B:
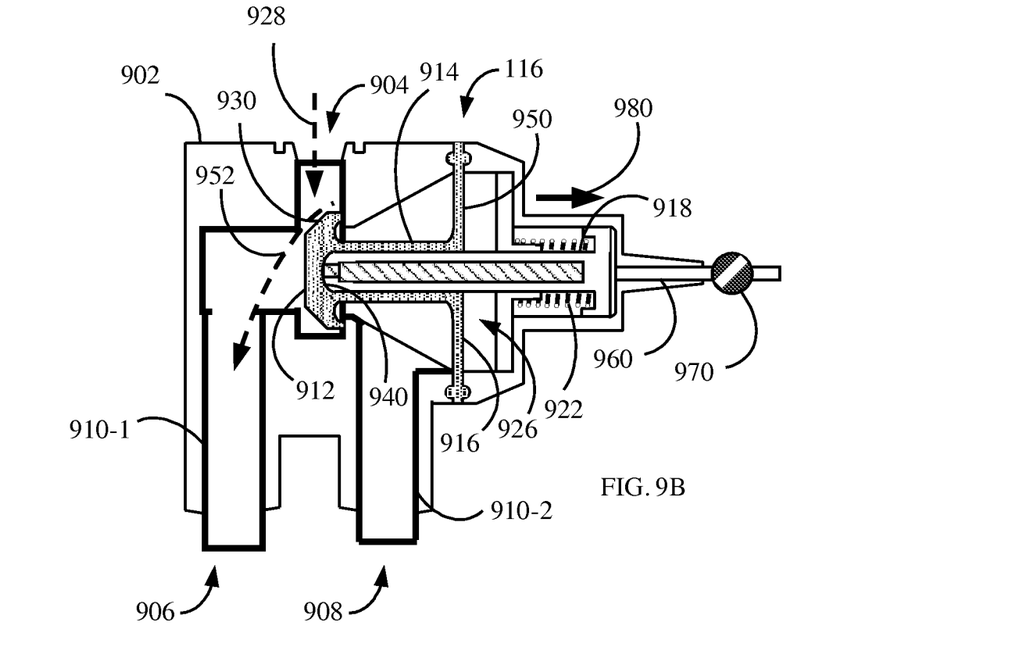
Figure 9C:
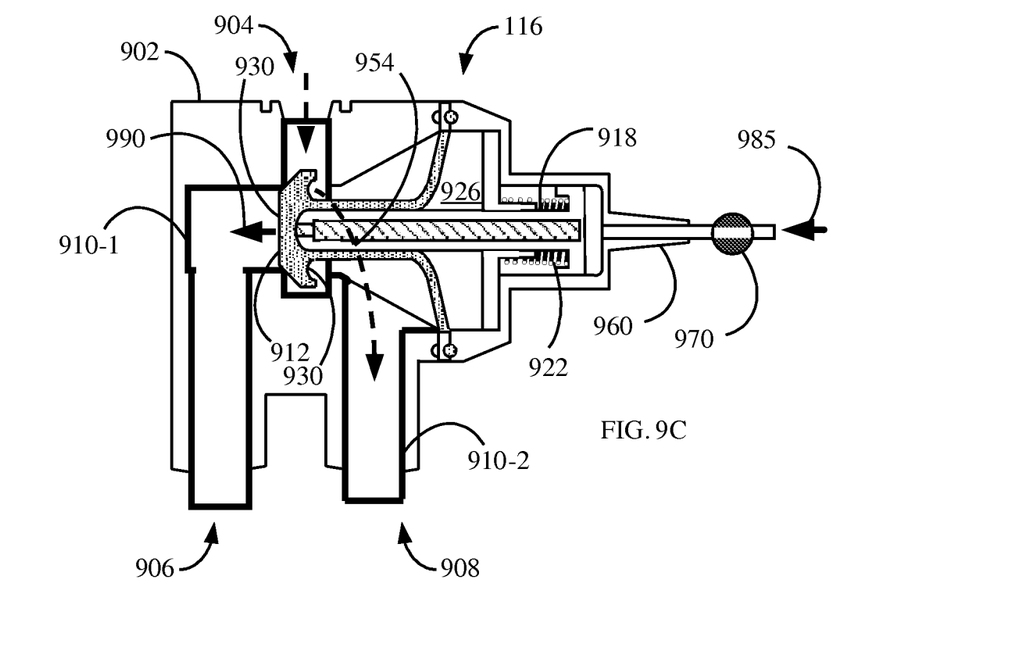

Referring now to FIGS. 9A, 9B and 9C, which are cross-section view simplified illustrations of changeover valve 116 in accordance with an example. Changeover valve 116 could be a three-way, single membrane, binary controlled valve and include a housing 902, having a milk inlet 904, a milk outlet 906 and a scrap milk outlet 908. Housing 902 could be made of any rigid material such as metal, plastic or a composite material, and could be made as a mold or of molded parts. Milk outlet 906 and a scrap milk outlet 908 could communicate with milk inlet 904 via corresponding milk conveying channels 910 inside housing 902. Milk conveying channels 910 converge at changeover junction 950 (encircled in FIG. 9A by a broken line), the milk flow therethrough controlled by a resilient plunger head 912 having a milk side 930 and a dry side 940 as will be described in greater detail below.

Changeover valve 116 could also include resilient sealing membrane 950 having a resilient plunger head 912, a resilient hollow stem 914 and a resilient base 916. Resilient plunger head 912 could be integrally or adhesively attached to a resilient hollow stem 914 and resilient base 916 together forming a single resilient sealing membrane 950. A rigid or semi-rigid shaft 918 could be accommodated inside and in parallel to longitudinal axis X of hollow stem 914, abut or be integrally or adhesively attached at one end thereof to dry side 940 of plunger head 912. The other end of shaft 918 could be adhesively or integrally attached to a bias retention ring 920 slidingly movable against bias 922 within a piston-like portion 924 of an atmospheric pressure air cavity 926. Housing 902 atmospheric pressure air cavity 926 is maintained isolated from milk inlet 904, milk outlet 906 and scrap milk outlet 908 by resilient sealing membrane 950 and communicates with atmospheric air via air inlet 960.

FIGS. 9B and 9C illustrate the mode of operation of changeover valve 116. Changeover valve 116 located inside SDU 112 could receive milk through milk inlet 904 streaming from an individual quarter or teat cup 102, via short tube 106, SSC 108, MCT 404 conduit 406 and SDU 112 sensors 114. Depending on a signal received from SDU 112, changeover valve 116 could alternate a selected path of flow of a received milk stream 928 via changeover junction 950 to milk outlet 906 or scrap milk outlet 908.

Under normal operating conditions, milk paths 910 are under sub-atmospheric pressure induced by one or more vacuum pumps (not shown) operating via milk outlet 906 or scrap milk outlet 908. At this point in time, atmospheric air inlet 960 is maintained closed by a single binary (on/off type) valve 970. Pressure on resilient plunger head 912 milk side 930 exerted by milk being suctioned via milk conveying channel 910-1 (FIG. 9B) and milk outlet 906 to one end of shaft 918 assisted by pressure exerted by bias 922 on the other end of shaft 918 bring about stem 914 of membrane 950 to slide in a direction indicated by arrow 980 opening a passageway 952 in junction 950 allowing the milk stream to flow towards milk outlet 906.

Under conditions in which milk is determined by SDU 112 to be scrap milk, SDU 112 opens valve 970 allowing atmospheric air to enter in a direction indicated by arrow 985 into atmospheric pressure air cavity 926. The sub-atmospheric pressure in milk conveying channel 910-1 applies negative pressure to plunger head 912 milk side 930 pulling plunger head 912 as well as shaft 918 in a direction indicated by arrow 990 against bias 922 thereby spring-loading bias 922.

The movement of Plunger head 912 milk side 930 brings about the sealing of passageway 952 and the opening of passageway 954 in junction 950 allowing the milk stream to flow towards milk outlet 908 as indicated by a broken line and into milk conveying channel 910-2 (FIG. 9C).

It will be appreciated by persons skilled in the art that the present invention is not limited to what has been particularly shown and described hereinabove. Rather, the scope of the invention includes both combinations and sub-combinations of various features described hereinabove as well as modifications and variations thereof which would occur to a person skilled in the art upon reading the foregoing description and which are not in the prior art.

I claim:

1. A milking system comprising
   at least two teat cups attachable to an animal's udder;
   at least one Multi-Conduit Tube (MCT) having at least two milk conduits;
   at least one Separate Streams Claw (SSC) configured to contain at least two milk streams, each said milk stream is in fluid communication with only one of said teat cups and only one of said milk conduits; and
   one Sensing and Diverting Unit (SDU) in communication with the MCT, said SDU configured to separately receive and separately analyze milk from each of said milk conduits; said SDU comprising at least two changeover valves, each said changeover valve configured to control passage of one of said milk streams,
   wherein each of said changeover valves is configured to divert one said milk stream into one of at least three milk conveying channels.

2. The milking system of claim 1, wherein the number of milk streams entering the Separate Streams Claw (SSC) is identical to the number of milk streams streaming out of the SSC.

3. The milking system of claim 1, wherein the SSC is chamberless.

4. The milking system of claim 1, wherein the SSC also includes at least two pulsating vacuum conduits.

5. The milking system of claim 4, wherein the pulsating vacuum conduits are configured to control each teat cup individually.

6. The milking system of claim 4, wherein the pulsating vacuum conduits have a diameter different in size than the diameter of the milk conduits.

7. The milking system of claim 4, wherein the pulsating vacuum conduits have a diameter smaller in size than the diameter of the milk conduits.

8. The milking system of claim 1, wherein the SSC also includes either a molded capsule or a multi-luminal potted enclosure.

9. The milking system of claim 1, wherein each of said changeover valves is a single membrane, binary controlled changeover valve.

10. The milking system of claim 1, wherein the SDU also includes at least one milk quality sensor.

11. The milking system of claim 1, wherein the MCT is a molded flexible block.

12. The milking system of claim 7, wherein said MCT has at least two sets of conduits, each set having conduits substantially arranged in a circle, the circle of each set being substantially concentric with the circle of the other set, thereby comprising an inner and an outer set, and further wherein said milk conduits are conduits of the outer set and said pulsating vacuum conduits are conduits of the inner set.

13. The milking system of claim 1, wherein said milk conveying channels divert said milk streams based on predefined criteria selected from a group consisting of: fat rich milk, fat thin milk, grade A milk, grade B milk, scrap milk, protein rich milk, low protein milk, milk contaminated by bacteria, milk contaminated by blood, milk contaminated by inflammatory by-products, and any combination thereof.

* * * * *